Patented Aug. 24, 1948

2,447,506

UNITED STATES PATENT OFFICE 2,447,506

COATING AND IMPREGNATING COMPOSITION

Louis John Jubanowsky, Vaux Hall, N. J., assignor to The Baker Castor Oil Company, Jersey City, N. J., a corporation of New Jersey No Drawing. Application July 31, 1944, Serial No. 547,519

14 Claims. (Cl. 106—250)

This invention relates to compositions for coating and impregnating fibrous, granular and other materials to render them resistant to the solvent action of mineral oils, aromatic hydrocarbons and other hydrocarbon materials.

One of the objects of this invention is to provide compositions for treating fibrous materials, such as leather, asbestos, paper, and also porous materials so as to cause them to be substantially impervious to and unaffected by mineral oils, aromatic hydrocarbons and the like. Another object of the invention is to modify the compositions for treating fibrous and other materials so that the treated materials are suitably pliable and flexible for use in a variety of applications. A further object is to provide compositions which have valuable lubricating properties for various applications. These compositions also impart waterproofness to materials that are coated or impregnated with them. Other objects and advantages will hereinafter appear.

When fibrous materials have been properly shaped and compacted for use as gaskets, packing, and the like, it is important that such fibrous materials be impervious to and unaffected by mineral oils and other hydrocarbons to which they may be exposed during use. It has now been discovered that a particularly beneficial class of compounds for treating and impregnating fibrous materials is the solid saturated esters of fatty acids and polyhydric alcohols which contain oxygen atoms in their molecular structure other than those present in the ester linkages. Thus, these compounds should contain one or more of such groups as the following: hydroxyl, carbonyl, alkoxy and aryloxy. "Carbonyl" includes both ketonic and aldehydic groups. "Ester linkages" refers to the carboxy groups joining the acid and alcohol portions of ester molecules. Hydrocarbon insolubility of the compounds of the present invention increases with increasing numbers of oxygen atoms per molecule, but compounds containing only one oxygen atom per molecule in addition to those present in the ester linkages have been found to be quite suitable for accomplishing the objects of this invention. It is preferable that solids be used for the treatment of fibrous materials as in this way the treatment is rendered more permanent than if the treatment were to be carried out with liquid agents. Consequently, it is preferred to use solids of the class of compounds described which melt above approximately 50° C. These solids are waxy in character, which is an added advantage when it is desired that the treated fibrous material have lubricating properties as in cases where the fibrous material is used in contact with moving parts, in machinery, for packing glands, or the like. For convenience this group of compounds will be designated as impregnants.

These impregnants are saturated esters of fatty acids and polyhydric alcohols, and contain oxygen atoms in their molecules in addition to those present in the ester linkages. In the case of mono-esters, at least some of this additional oxygen is present as unesterified hydroxyl groups of the esterified polyhydric alcohol. In the diesters of trihydric alcohols, at least part of the additional oxygen is supplied by the unesterified hydroxyl group of the trihydric alcohol. When the polyhydric alcohols are completely esterified, the additional oxygen atom or atoms are present in the form of hydroxyl or carbonyl groups or ethereal linkages, which may be part of the fatty acid or part of the polyhydric alcohol portion of the ester molecule, except in the case of hydroxyl groups, which are attached to the fatty acid portion of the ester molecule when the polyhydric alcohol is completely esterified.

The fatty acids used in forming the esters of this invention should contain more than ten carbon atoms per molecule so that the esters are solids that melt above 50° C. Fatty acids found in natural sources, as in vegetable oils, which have straight carbon chains, as well as branched-chain fatty acids may also be components of the esters used in carrying out this invention. The oxygen substituents may alternatively be present in the polyhydric alcohol molecular structures. The fatty acid radicals may also have such substituents as halogen, amino, substituted amino, sulfonic acid, sulfate, phosphonic acid, cyanide, borate groups and the like therein. For example, fatty acids such as oleic, palmitic, lauric, arachidic, melissic, and erucic acids, as well as fatty acids obtained by hydrolysis of vegetable oils, all having appropriate substituents as mentioned, may be readily utilized in forming the impregnants of this invention.

Various polyhydric alcohols may be used as constituents of the esters such as glycerine, ethylene glycol, propylene glycol, pentaerythritol, sorbitol, sebachyl alcohol, glyceraldehyde, dihydroxyacetone and methoxy propanediol. As in the case of the fatty acids, the polyhydric alcohols may have various substituent groups, including groups containing additional oxygen substituents.

Esters derived from naturally occuring esters may be treated and utilized as impregnants according to this invention. For example, castor oil may be hydrogenated to yield 12-hydroxy stearin, which is saturated, waxy solid melting at 80°–86° C., and is well suited as the impregnant or coating material. It is preferable that the castor oil be completely saturated, but the iodine number of the hydrogenated material may permissibly range up to a value of approximately 10. The castor oil should be hydrogenated selectively, so that the hydroxyl group initially present is not affected.

Other vegetable oils, which are not suitable as impregnants in accordance with this invention may be treated so as to yield satisfactory products. Such oils are first subjected to oxidation, such as catalytic oxidation using air, permanganate oxidation, or the like, so as to introduce oxygen-containing groups into the fatty acid portions of the vegetable oil molecules. Hydrogenation of the oxidized materials may then follow, if required to remove any remaining unsaturation. Such treatment is not limited to any particular vegetable oil, but may be utilized in treating such oils as dehydrated castor, tung, linseed, soybean, cottonseed, olive, palm kernel, and similar oils. Other methods for introducing oxygen-containing groups may be utilized, such as halogenation followed by substitution of oxygen-containing groups for the halogen atoms, addition of compounds having oxygen-containing groups at unsaturated linkages of the oil molecules, and other known methods.

The impregnants made in accordance with this invention are solids which are not characterized by being particularly flexible at ordinary or reduced temperatures such as may be encountered in the stratosphere or in the arctic regions. In carrying out this invention modifiers are incorporated in the impregnants prior to applying the latter to fibrous or other materials. By using the modifiers the flexibility of the impregnants is improved so that materials treated with them remain impervious to hydrocarbons under varied conditions of use where stresses due to flexing, compression and tension occur. The modifiers that are used are not affected by exposure to or contact with hydrocarbons, and they also increase the resistance of the impregnants to hydrocarbons.

The modifiers of this invention are produced by airblowing unsaturated esters of fatty acids and polyhydric alcohols. The unsaturated linkage of the esters may be present in the fatty acid portion or in the polyhydric alcohol portion of the molecule or in both portions. The fatty acids should have at least six carbon atoms per molecule, and may be straight or branch-chained. The polyhydric alcohols may be such as those specified for use in the impregnants of this invention. Glycerine is the most commonly used polyhydric alcohol, since it occurs in the unsaturated vegetable oils. The latter come within the category of esters which may be treated by air-blowing for the production of the modifiers. Typical unsaturated vegetable oils which may be utilized in this connection are castor, tung, safflower, soybean, corn, and olive oils.

The unsaturated esters are treated for producing the modifiers by passing air through them at a somewhat elevated temperature in the range from about 100° to about 175° C. Two types of reactions occur during the process of air-blowing, namely, oxidation and polymerization. The products preferably have a semi-rubbery, gel-like structure. For example, in the case of blown castor oil, the gel may remain solid up to a temperature of approximately 100° C. When the air-blowing is not carried far enough to produce a solid gel, the products of the air-blowing are viscous oily liquids, which may also be used for modifying the impregnants. However, as indicated, it is preferable to use the more solid modifiers for the purposes of this invention, as such solid products are more highly resistant to hydrocarbons than are the liquid products of air-blowing.

The modifiers of the invention are preferably mixed with the impregnants to the extent of 5% to 50% by weight, based on the total mixture. Less than 5% of modifier may be used but the desirable effects are not as pronounced as when more of the modifier is used. When more than 50% of modifier is used, the waxy character of the impregnants of the invention may be lost.

The mixing of the impregnant and its modifier is preferably effected by melting the impregnant and adding the modifier to the melt. Heating and stirring are continued at an elevated temperature until homogeneity is attained. When the finished material is cool it is suitable for treating and impregnating fibrous and other materials.

Properties of the impregnating materials may be altered to suit the needs of particular applications of the impregnating materials. For example, the impregnants may contain halogen. Such halogen-containing impregnants are useful for imparting flame-proofing properties to treated fibrous materials. When it is desirable to increase the lubricant properties of the finished material, this may be done by including such substances as graphite and talc in the final impregnating composition. Inert fillers such as wood flour and kieselguhr may be added to the composition when it is desired to give more body to the composition or to the treated fibrous material.

A further addition may be made to the impregnating compositions, namely, the heavy metal soaps of the fatty acids contained in the impregnant esters. Such soaps as those of calcium, aluminum, and lead may be used. These soaps have the property of improving the water repellant properties of the finished impregnating composition. Other sorts of addition agents may be used with the impregnating compositions, their choice depending upon the particular effects desired.

All types of fibrous materials may be treated and impregnated by means of the impregnated compositions of this invention. Such fibrous materials include leather, paper, canvas, cotton, kapock, asbestos, rayon, hemp, flax, wood and others. The fibers may be treated while loose and non-compacted. or after fabrication of the finished fibrous article or shape. The fibers may be freed of moisture by any of the known methods, as by the use of heat, vacuum, or the like, before the impregnation treatment. Or the fibrous materials may be treated with the impregnating compositions in the form of emulsions prepared by known methods.

The impregnating compositions of the invention may be used for treating other than fibrous materials; in fact, any materials, including granular, porous, and non-porous materials, may be treated with them especially when it is desired to make use of the hydrocarbon-resistant properties of such compositions. These compositions may, for example, be applied as protective coatings to natural and synthetic rubbers and plastics.

The choice of impregnation method will depend on the particular circumstances in each instance. In most cases, any of the generally known methods may be used for this purpose. For example, the fibrous material may be dipped into a heated bath of the impregnating composition followed by cooling of the treated material; or the fibrous material may be placed in a suitable chamber, vacuum applied to the chamber, the impregnating composition introduced at an appropriate temperature, and then pressure applied to the chamber. The vacuum serves to remove air and moisture from the fibrous material, while the application of pressure to the impregnating composition forces the composition into the interstices of the fabric in a positive manner. When the fibrous material is in sheeted form the sheets may be fed through hot rolls from which the impregnating composition is fed to the sheets. Other methods for impregnating the fibrous material may be used.

Fibrous materials treated with the impregnating compositions described herein may be used for many purposes. They are particularly useful when it is important that such material is to resist the action of hydrocarbons such as naphtha, gasoline, mineral lubricating oil and greases, aromatic hydrocarbons, hydrocarbon pitches and asphalts, and the like. Among uses for which the impregnating compositions of this invention are particularly suited may be mentioned impregnation of gaskets made of fibrous materials such as leather, asbestos, paper, and the like; shingles and tile made of fibrous material such as asbestos; packing such as is used in stuffing boxes; fibrous material for use as liners in gasoline hose; self-sealing gasoline tanks and the like; sole leather for shoes used by workers in machine shops; petroleum refineries; gasoline service stations, and the like; paper to be used as a lubricating interliner for leaf springs in various types of vehicles; as an interliner between the soles of shoes to prevent squeaking and hydrocarbon penetration; cotton and similar fabrics used for making work overalls; and fibrous materials to be used in similar and other types of applications. The compositions of this invention may also be utilized for rendering fibrous articles, such as leather goods, soft and pliable, and as modifiers in waxes and polishes where it is desired to increase the hydrocarbon resistance of such compositions. Other uses will be apparent from the properties of the impregnating compositions of this invention.

Examples will now be given of the methods of compounding the impregnating compositions described herein. It will be understood that the invention is not restricted to the particular proportions or details related below. Parts given are by weight.

*Example I.*—85 parts by weight of hydrogenated castor oil, in flake form, were heated to 130° C. in an open container and 15 parts of solid blown castor oil, produced by air-blowing of castor oil at approximately 150° C., were then added. The mixture was stirred until homogeneous. When allowed to cool, the product solidified to a wax-like solid, which was light brown in color. This product is particularly useful for the impregnation of fibrous materials to render them hydrocarbon resistant.

*Example II.*—70 parts of soya bean oil, which had first been oxidized to a sufficient degree to produce hydrocarbon insolubility, and then hardened by hydrogenation, were heated to 120° in an open vessel. 30 parts of solid brown soya bean oil, produced by air-blowing of soya-bean oil at approximately 110° C. were added. The mixture was stirred until it was homogeneous when cool, the product was similar in appearance and applicability to the product of Example I. It has been found that the lower temperature at which the air oxidation of soya bean and other vegetable oils is carried out, the greater is the insolubility of the resulting products in hydrocarbons. Thus, in th case of soya bean oil, most satisfactory results are obtained when the air oxidation is effected at a temperature in the range from about 90° to about 110° C.

*Example III.*—A diester of pentaerythritol was prepared from 4-ketoelaeostearic acid, obtained from oiticica oil by hydrolysis. This diester was then selectively hydrogenated to remove carbon-carbon unsaturation. 75 parts of the resulting diester of 4-ketostearic acid and pentaerythritol were heated to approximately 110° C. in an open container. 20 parts of solid brown diester of 4-ketoelaeostearic acid and pentaerythritol, produced similarly to the blown oils of Examples I and II, were added. Stirring and heating of the mixture were continued until a clear melt was obtained. The product obtained on cooling was a waxy, light-colored solid, which was quite suitable for impregnating fibrous materials, such as leather, asbestos, and paper, in accordance with this invention.

*Example IV.*—85 parts of hydrogenated castor oil in flake form were heated to 125° C. in an open container. 12 parts of solid blown castor oil, produced as in Example I, were then added, along with 3 parts of lead ricinoleate. The mixture was stirred until it was homogeneous. When cooled it was a light brown solid, which was somewhat more waxlike in appearance and feel than the composition of Example I. The proportions of ingredients used in this example may be varied. For instance, it has been found that quite satisfactory results are produced by incorporating as much as 20% of heavy metal salts such as lead ricinoleate in the impregnating compositions.

Many variations of the compositions disclosed herein will be apparent, and the claims are not limited to the specific compositions set forth in the preceding examples.

It has also been found that esters can be used for the purposes of this invention which are esters of monohydric alcohols and hydroxy acids having at least 14 carbon atoms in the chain, or esters which are esters of hydroxy acids and alcohols having at least 12 carbon atoms in the chain.

Also, esters in which either the hydroxy acid or alcohol radical has less than the number of carbon atoms specified above, but in which the other radical has sufficiently more carbon atoms than the indicated minimum to bring the melting point of the ester above about 50° C., are suitable as coatings and impregnants. Examples of this sort of ester are: methyl ester of 11-hydroxypalmitic acid, M. P. 50° C.; ethyl ester of 12-hydroxystearic acid, M. P. 51° C.; methyl ester of 2-hydroxyarachidic acid, M. P. 63° C.

What is claimed is:

1. A substantially solid, fusible impregnating and coating composition which is resistant to the solvent action of hydrocarbons, which comprises a mixture of a solid, substantially saturated ester of a fatty acid containing more than ten carbon atoms per molecule and a polyhydric alcohol, which ester contains an oxygen atom in its molecular structure other than those present in the ester linkages and which melts above about 50° C., and has an iodine number less than about 10, and 5 to 50% by weight, based on the total mixture, of a non-hydrogenated air-blown unsaturated ester of a polyhydric alcohol and an unsaturated fatty acid derivable from unsaturated vegetable oils.

2. The composition of claim 1, in which the non-hydrogenated air-blown unsaturated ester contains an oxygen atom in its molecular structure other than those present in the carboxyl group.

3. A substantially solid, fusible, impregnating and coating composition which is resistant to the solvent action of hydrocarbons, which comprises a mixture of a solid, hydroxyl-containing, substantially saturated ester of a fatty acid containing more than ten carbon atoms per molecule and a polyhydric alcohol which ester melts above about 50° C., and has an iodine number less than about 10, and 5 to 50% by weight, based on the total mixture of a non-hydrogenated, air-blown unsaturated ester of a polyhydric alcohol and an unsaturated fatty acid derivable from unsaturated vegetable oils.

4. A substantially solid, fusible impregnating and coating composition which is resistant to the solvent action of hydrocarbons, which comprises a mixture of a solid, substantially saturated vegetable oil, which contains an oxygen atom in its molecular structure other than those present in the ester linkages, and which melts above about 50° C., and has an iodine number less than about 10, and 5 to 50% by weight, based on the total mixture, of a non-hydrogenated air-blown unsaturated ester of a polyhydric alcohol and an unsaturated fatty acid derivable from unsaturated vegetable oils.

5. A substantially solid, fusible impregnating and coating composition which is resistant to the solvent action of hydrocarbons, which comprises a mixture of a solid, hydroxyl-containing, substantially saturated vegetable oil, which melts above about 50° C., and has an iodine number less than about 10, and 5 to 50% by weight, based on the total mixture, of a non-hydrogenated air-blown unsaturated ester of a polyhydric alcohol and an unsaturated fatty acid derivable from unsaturated vegetable oils.

6. The composition of claim 5 in which said substantially saturated vegetable oil has been produced by hydrogenation.

7. A substantially solid, fusible impregnating and coating composition which is resistant to the solvent action of hydrocarbons, which comprises a mixture of a solid, hydroxyl-containing, substantially saturated ester of a fatty acid containing more than ten carbon atoms per molecule and a polyhydric alcohol, which ester melts above about 50° C., and has an iodine number less than about 10, and 5 to 50% by weight, based on the total mixture, of a non-hydrogenated, air-blown unsaturated vegetable oil.

8. The composition of claim 7, in which the ester used is a hydroxyl-containing substantially saturated vegetable oil.

9. A substantially solid, fusible impregnating and coating composition which is resistant to the solvent action of hydrocarbons, which comprises a mixture of a substantially saturated vegetable oil, which contains an oxygen atom in its molecular structure other than those present in the ester linkages, prepared by the oxidation of an unsaturated vegetable oil having oxygen atoms present only in its ester linkages and the subsequent hydrogenation of said oxidized oil, said saturated vegetable oil melting above about 50° C., and having an iodine number less than about 10, and 5 to 50% by weight, based on the total mixture, of a non-hydrogenated, air-blown unsaturated vegetable oil.

10. A substantially solid, fusible impregnating and coating composition which is resistant to the solvent action of hydrocarbons, which comprises a mixture of hydroxyl-containing, hydrogenated castor oil and 5 to 50% by weight, based on the total mixture, of a non-hydrogenated air-blown castor oil.

11. The composition of claim 10 in which the air-blowing of castor oil was at a temperature of below about 175° C.

12. A substantially solid, fusible impregnating and coating composition which is resistant to the solvent action of hydrocarbons, which comprises a mixture of hydroxyl-containing, hydrogenated castor oil having an iodine number of 0 to 10 and 5 to 50% by weight, based on the total mixture, of a non-hydrogenated air-blown castor oil, said product being characterized by retaining a substantially solid, gel-like structure up to approximately 100° C.

13. A substantially solid, fusible impregnating and coating composition which is resistant to the solvent action of hydrocarbons, which comprises a mixture of hydroxyl-containing, hydrogenated castor oil and 5 to 50% by weight, based on the total mixture, of a non-hydrogenated air-blown soya bean oil.

14. A substantially solid, fusible impregnating and coating composition which is resistant to the solvent action of hydrocarbons, which comprises a mixture of a solid, substantially saturated linseed oil, which contains an oxygen atom in its molecular structure other than those present in the ester linkages, and 5 to 50% by weight, based on the total mixture, of a non-hydrogenated, air-blown castor oil.

LOUIS JOHN JUBANOWSKY.

REFERENCES CITED

The following references are of record in the file of this patent:

UNITED STATES PATENTS

| Number | Name | Date |
|---|---|---|
| 2,158,494 | Corteen | May 16, 1939 |
| 2,289,085 | Halewijn | July 7, 1942 |

FOREIGN PATENTS

| Number | Country | Date |
|---|---|---|
| 266,466 | Great Britain | Feb. 24, 1927 |

Certificate of Correction

Patent No. 2,447,506                                                                    August 24, 1948

LOUIS JOHN JUBANOWSKY

It is hereby certified that errors appear in the printed specification of the above numbered patent requiring correction as follows:

Column 2, line 44, after the word and period "invention." insert the sentence *Examples of fatty acids having appropriate oxygen-containing substituents are ricinoleic, linusic, stearoxylic, 12-methoxystearic, and formylpalmitic acids.*; column 4, line 54, for "impregnated", second occurrence, read *impregnating*; line 57, for "kapock" read *kapok*; column 7, line 24, after "mixture" insert a comma;

and that the said Letters Patent should be read with these corrections therein that the same may conform to the record of the case in the Patent Office.

Signed and sealed this 7th day of March, A. D. 1950.

[SEAL]

THOMAS F. MURPHY,
                                             *Assistant Commissioner of Patents.*